United States Patent
Kameda

(10) Patent No.: US 11,156,578 B2
(45) Date of Patent: Oct. 26, 2021

(54) FLUID-PROPERTY DETECTION DEVICE

(71) Applicant: KYB Corporation, Tokyo (JP)

(72) Inventor: Yukinori Kameda, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 0 days.

(21) Appl. No.: 16/641,327

(22) PCT Filed: May 14, 2018

(86) PCT No.: PCT/JP2018/018609
§ 371 (c)(1),
(2) Date: Feb. 24, 2020

(87) PCT Pub. No.: WO2019/049430
PCT Pub. Date: Mar. 14, 2019

(65) Prior Publication Data
US 2020/0386704 A1    Dec. 10, 2020

(30) Foreign Application Priority Data

Sep. 11, 2017   (JP) .............................. JP2017-174362

(51) Int. Cl.
*G01N 27/22*        (2006.01)

(52) U.S. Cl.
CPC .................................. *G01N 27/226* (2013.01)

(58) Field of Classification Search
CPC ....... G01N 27/226; G01N 27/06; G01N 27/22
See application file for complete search history.

(56) References Cited

U.S. PATENT DOCUMENTS

| | | |
|---|---|---|
| 4,931,354 A | 6/1990 | Wakino et al. |
| 2007/0017806 A1* | 1/2007 | Furuta ................ G01N 27/4071 204/424 |
| 2010/0269568 A1* | 10/2010 | Kanao ................ G01N 27/4075 73/31.05 |
| 2013/0019655 A1* | 1/2013 | Nakagawa ........... G01N 27/419 73/31.05 |
| 2013/0213118 A1 | 8/2013 | Nakamura |
| 2014/0190828 A1* | 7/2014 | Kamada ............. G01N 27/4078 204/427 |
| 2014/0375339 A1 | 12/2014 | Osada et al. |

FOREIGN PATENT DOCUMENTS

| | | |
|---|---|---|
| JP | H01120095 A | 5/1989 |
| JP | 2009025185 A | 2/2009 |
| JP | 2014142204 A | 8/2014 |

* cited by examiner

*Primary Examiner* — Alvaro E Fortich
(74) *Attorney, Agent, or Firm* — Rabin & Berdo, P.C.

(57) ABSTRACT

A fluid-property detection device includes a first electrode, a second electrode provided so as to face the first electrode, and an insulating member provided between the first electrode and the second electrode, the insulating member being configured to insulate between the first electrode and the second electrode. The insulating member is provided with a reduced-thickness portion for forming a hollow portion between the first electrode and the second electrode in a region in which the first electrode and the second electrode are not exposed to the detection target fluid.

7 Claims, 9 Drawing Sheets

FLUID-PROPERTY DETECTION DEVICE

TECHNICAL FIELD

The present invention relates to a fluid-property detection device.

BACKGROUND ART

JP2009-25185A discloses an electric conductivity meter provided with a pipe-shaped outer electrode, a bar-shaped inner electrode, and a conductive electrode holding member that holds the inner electrode via an insulating resin and that is formed so as to be connected to or integral with the outer electrode. The insulating resin (a molding resin) insulates the electrodes from each other by being filled into a space between the inner electrode and the electrode holding member that is formed so as to be connected to or integral with the outer electrode.

SUMMARY OF INVENTION

With the detection device that detects electrostatic capacitance between a tip end portion of the outer electrode and a tip end portion of the inner electrode that form a detection portion exposed to a detection target fluid, the electrostatic capacitance between other parts of the respective electrodes than the detection portion is added as stray capacitance. Therefore, if the molding resin is filled in the space between the other parts of the respective electrodes than the detection portion without forming a gap, a percentage of the stray capacitance relative to the electrostatic capacitance detected between the electrodes is increased, and there is a problem in that detection accuracy is deteriorated.

An object of the present invention is to improve detection accuracy of a fluid-property detection device.

According to one aspect of the present invention, a fluid-property detection device for detecting a property of a detection target fluid includes: a first electrode; a second electrode provided so as to face the first electrode; and an insulating member provided between the first electrode and the second electrode, the insulating member being configured to insulate between the first electrode and the second electrode. The insulating member is provided with a reduced-thickness portion for forming a hollow portion between the first electrode and the second electrode in a region in which the first electrode and the second electrode are not exposed to the detection target fluid.

DESCRIPTION OF EMBODIMENTS

First Embodiment

A fluid-property detection device according to a first embodiment of the present invention will be described below with reference to the drawings.

The fluid-property detection device detects a property of working oil by being attached directly to a fluid pressure apparatus, such as a hydraulic cylinder, etc., that is driven by utilizing the working oil as working fluid or by being attached to a piping connected to the hydraulic cylinder, etc., for example. It should be noted that the detection target fluid as a detection target for the fluid-property detection device is not limited to the working oil, and may be various kinds of liquid and gas such as lubricating oil, cutting oil, fuel, solvent, chemical agent, and so forth. In the following, a description will be given of a case in which the fluid-property detection device is an oil-property detection device 100 that detects the property of the working oil as the detection target fluid.

Figure 1:
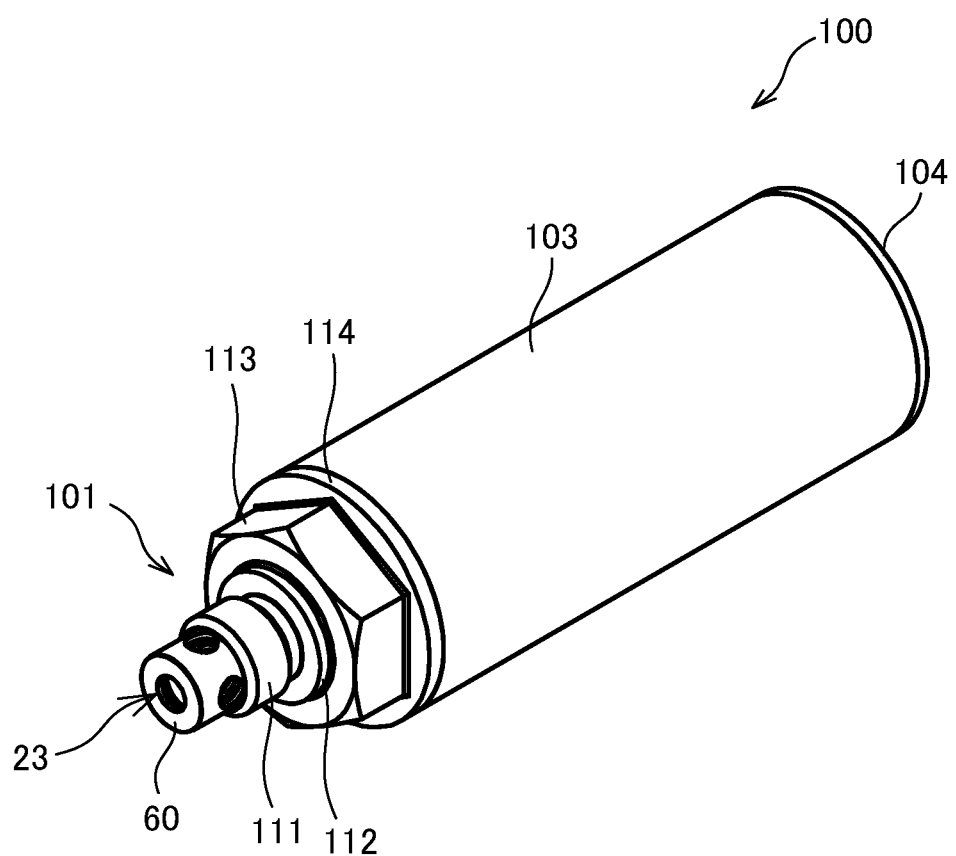
FIG. 1 is an external perspective view of an oil-property detection device according to a first embodiment of the present invention.
Figure 2:
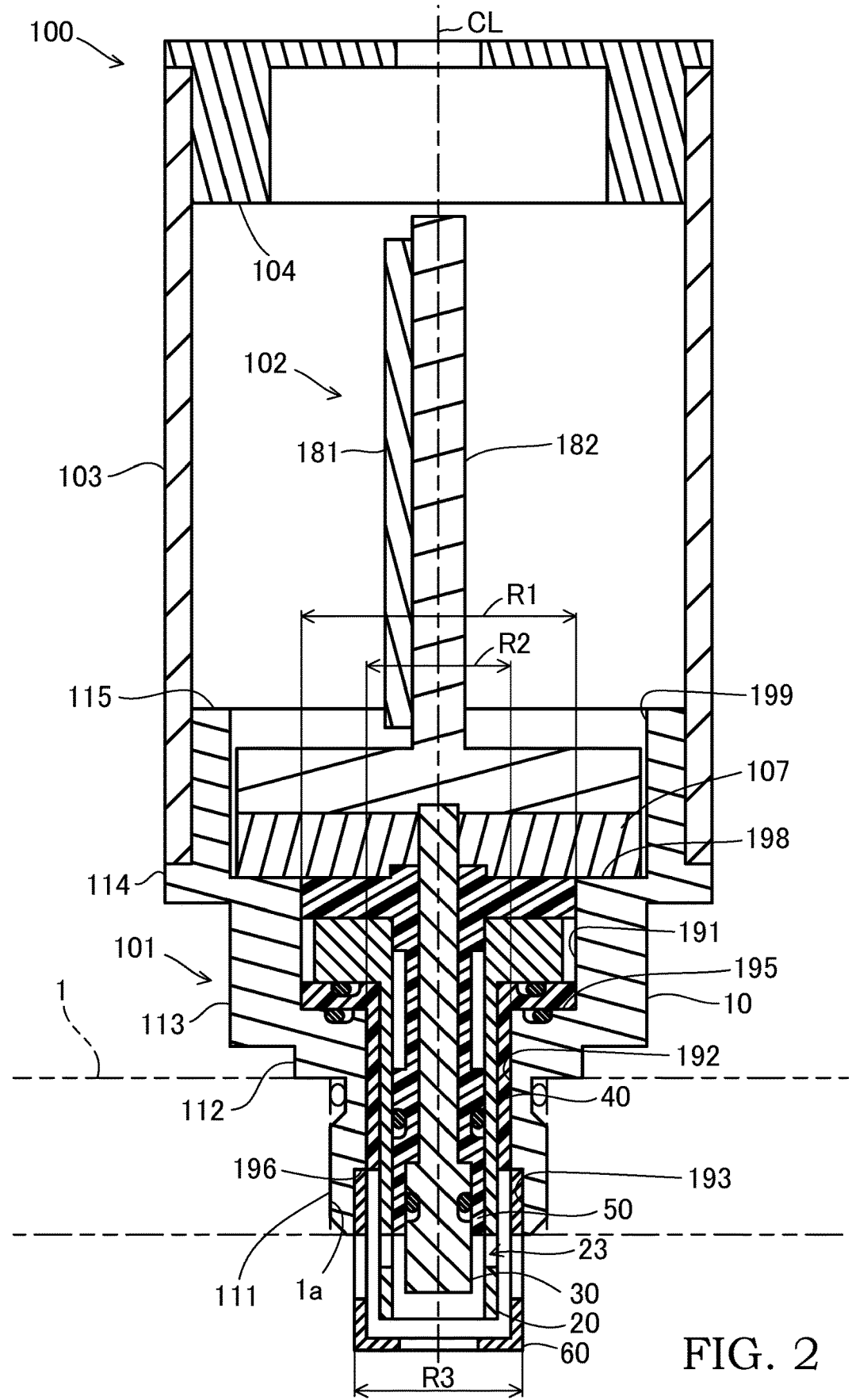
FIG. 2 is a schematic view of a longitudinal cross-section of the oil-property detection device.

As shown in FIGS. 1 and 2, the oil-property detection device 100 has a detection unit 101, a board unit 102 attached to the detection unit 101, a cylindrical-shaped cylindrical cover 103 that is attached to the detection unit 101 and covers the board unit 102, and an end cover 104 that closes an opening of the cylindrical cover 103.

As shown in FIG. 2, the detection unit 101 is provided with: a tubular outer electrode (second electrode) 20; a bar-shaped inner electrode (first electrode) 30 that is provided inside the outer electrode 20 so as to face the outer electrode 20; a housing 10 that is attached to a piping 1 and holds the outer electrode 20 and the inner electrode 30; an attachment plate 107 that is fixed to the housing 10 by screws, etc.; an outer spacer 40 that is provided between the housing 10 and the outer electrode 20, that insulates between the housing 10 and the outer electrode 20, and that defines a position of the outer electrode 20 with respect to the housing 10; an inner spacer 50 serving as an insulating member that is provided between the outer electrode 20 and the inner electrode 30, that insulates between the outer electrode 20 and the inner electrode 30 and insulates between the housing 10 and the inner electrode 30, and that defines a position of the inner electrode 30 with respect to the housing 10; and an electrode cover 60 that is attached to the housing 10 and covers tip end portions of the outer electrode 20 and the inner electrode 30.

In the following, the direction parallel to a center axis CL of the outer electrode 20 is referred to as the axial direction of the oil-property detection device 100, and the direction perpendicular to the axial direction is referred to as the radial direction of the oil-property detection device 100. In addition, the side at which the end cover 104 is arranged is referred to as the base end side of the oil-property detection device 100, and the opposite side in the axial direction is referred to as the tip end side of the oil-property detection device 100.

The oil-property detection device 100 is attached to the piping 1, through the inside of which the working oil flows, by being screw connected, and the electrical properties of the working oil are detected by a detection portion 23 that is arranged inside the piping 1. The detection portion 23 is configured with the tip end portions of the outer electrode 20 and the inner electrode 30. The detection portion 23 protrudes out from the housing 10 so as to be exposed to the working oil contained in the piping 1.

The board unit 102 is provided with a circuit board 181 and a board holding member 182 that holds the circuit board 181. The board holding member 182 is fixed to the attachment plate 107 of the detection unit 101 by using screws, etc.

The housing 10 is formed of a conductive metal material, and has an attachment portion 111, a mounting portion 112, a nut portion 113, a cover receiving portion 114, and an inserted portion 115 in this order from the tip end side to the base end side. The attachment portion 111 has a cylindrical shape, and is formed with an external thread on an outer circumference thereof so as to engage with an internal thread formed on an inner circumference of an attachment hole 1a of the piping 1. By inserting and screwing the attachment portion 111 to the attachment hole 1a, the oil-property detection device 100 is attached to the piping 1.

The mounting portion 112 is a disc-shaped portion having an outer diameter larger than that of the attachment portion 111, and a surface on the tip end side thereof is mounted on a circumferential edge portion of an opening of the attachment hole 1a of the piping 1. It should be noted that the configuration is not limited to a case in which the mounting portion 112 is attached directly to the piping 1, however; the mounting portion 112 may be attached to the piping 1 via a cover plate.

The nut portion 113 is formed to have a hexagonal column shape. Therefore, it is possible to attach the attachment portion 111 to the attachment hole 1a with ease by rotating the nut portion 113 by a tool such as a spanner, etc.

The inserted portion 115 has a cylindrical shape and is a portion that is inserted into the inside of the cylindrical cover 103. The cover receiving portion 114 is a flange part that protrudes radially outwards from the base end of the nut portion 113, and a tip end surface of the cylindrical cover 103 is brought into contact with the cover receiving portion 114.

In a state in which the inserted portion 115 is inserted into the cylindrical cover 103 and the tip end surface of the cylindrical cover 103 is brought into contact with the cover receiving portion 114, the cylindrical cover 103 is fixed to the inserted portion 115 by screws, etc.

The end cover 104 is fixed to the cylindrical cover 103 with screws, etc. in a state in which the opening of the cylindrical cover 103 on the base end side is closed by the end cover 104. The board unit 102 is accommodated in an accommodating space defined by the end cover 104, the cylindrical cover 103, and the detection unit 101.

An attachment-plate receiving portion 199 as a space for receiving the attachment plate 107 is provided inside the housing 10. In addition, in the interior of the housing 10, a large-diameter receiving portion 191, a small-diameter receiving portion 192, and a middle-diameter receiving portion 193 are formed on the tip end side of the attachment-plate receiving portion 199 in this order from the base end side to the tip end side as a space for receiving the electrodes and the insulating members.

The large-diameter receiving portion 191, the small-diameter receiving portion 192, and the middle-diameter receiving portion 193 are respectively formed to have circular cross-sections and are formed coaxially. In other words, the large-diameter receiving portion 191, the small-diameter receiving portion 192, and the middle-diameter receiving portion 193 are provided such that their respective center axes coincide with each other. An inner diameter R1 of the large-diameter receiving portion 191, an inner diameter R2 of the small-diameter receiving portion 192, and an inner diameter R3 of the middle-diameter receiving portion 193 are related in terms of their sizes such that R1>R3>R2 is satisfied.

Because the inner diameter R1 of the large-diameter receiving portion 191 is formed so as to be larger than the inner diameter R2 of the small-diameter receiving portion 192, a step portion 195 is formed between an inner circumferential surface of the large-diameter receiving portion 191 and an inner circumferential surface of the small-diameter receiving portion 192. Because the inner diameter R3 of the middle-diameter receiving portion 193 is formed so as to be larger than the inner diameter R2 of the small-diameter receiving portion 192, a step portion 196 is formed between an inner circumferential surface of the middle-diameter receiving portion 193 and the inner circumferential surface of the small-diameter receiving portion 192.

Because an inner diameter of the attachment-plate receiving portion 199 is formed so as to be larger than the inner diameter R1 of the large-diameter receiving portion 191, a step portion 198 is formed between an inner circumferential surface of the attachment-plate receiving portion 199 and the inner circumferential surface of the large-diameter receiving portion 191. The attachment plate 107 is fixed to the step portion 198 with screws, etc.

Figure 3:
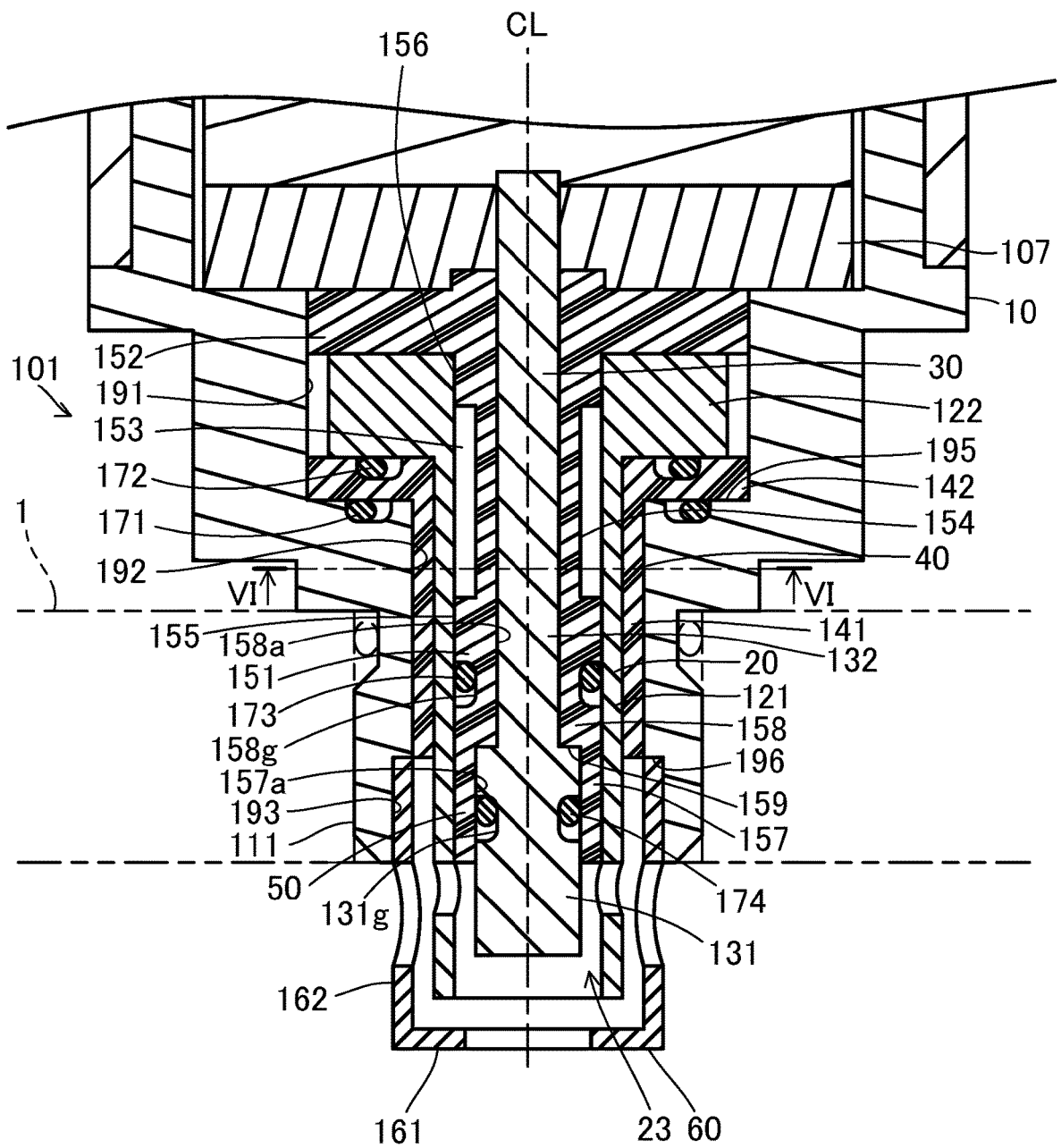
FIG. 3 is a schematic view of a longitudinal cross-section of a detection unit.

As shown in FIG. 3, the outer electrode 20 is arranged coaxially with the inner electrode 30 so as to cover an outer circumference of the inner electrode 30. A gap through which the working oil can enter is formed between the tip end portion of the inner electrode 30 and the tip end portion of the outer electrode 20 forming the detection portion 23. The outer electrode 20 and the inner electrode 30 are each electrically connected to a detection circuit 185 (see FIG. 4), which is mounted on the circuit board 181, via electric wirings (not shown).

The outer electrode 20 is formed of a conductive metal material and has a cylindrical-shaped outer-electrode tube portion 121 and an outer-electrode flange 122 that protrudes radially outwards from a base end portion of the outer-electrode tube portion 121. The outer spacer 40 is formed of an insulating resin material and has an outer insulating tube portion 141 that is a cylindrical-shaped insulating tube portion and an outer insulating flange 142 that protrudes radially outwards from a base end portion of the outer insulating tube portion 141.

The inner electrode 30 is formed of the conductive metal material and has a circular columnar large-diameter portion 131 that is provided at the tip end and a circular columnar small-diameter portion 132 that extends towards the base end side of the oil-property detection device 100 from the large-diameter portion 131. The inner spacer 50 is formed of an insulating resin material and has an inner insulating tube portion 151 that is a cylindrical-shaped insulating tube portion and an inner insulating flange 152 that protrudes radially outwards from a base end portion of the inner insulating tube portion 151.

In the large-diameter receiving portion 191 in the housing 10, the outer insulating flange 142, the outer-electrode flange 122, and the inner insulating flange 152 are received in a state in which they are arranged by being stacked in this order from the tip end side to the base end side.

The inner insulating flange 152, the outer-electrode flange 122, and the outer insulating flange 142 are sandwiched between the step portion 195 of the housing 10 and the attachment plate 107. Thus, the position of the outer electrode 20 in the axial direction is defined by the outer insulating flange 142 and the inner insulating flange 152.

An outer circumferential surface of the inner insulating flange 152 and an outer circumferential surface of the outer insulating flange 142 are in contact with the inner circumferential surface of the large-diameter receiving portion 191. Thus, the positions of the outer spacer 40 and the inner spacer 50 in the radial direction are defined by the large-diameter receiving portion 191 of the housing 10.

A base end portion of the inner electrode 30 is adhered to the attachment plate 107, and the inner electrode 30 projects out from the attachment portion 111 by extending from the attachment plate 107 through the large-diameter receiving portion 191, the small-diameter receiving portion 192, and the middle-diameter receiving portion 193.

The inner insulating tube portion 151 extends in the axial direction from the inner insulating flange 152 to a tip end surface of the attachment portion 111. A tip end surface of the inner insulating tube portion 151 is formed to be flush with the tip end surface of the attachment portion 111.

The outer-electrode tube portion 121 protrudes out from the attachment portion 111 by extending from the outer-electrode flange 122 through the large-diameter receiving portion 191, the small-diameter receiving portion 192, and the middle-diameter receiving portion 193.

The outer insulating tube portion 141 extends in the axial direction from the outer insulating flange 142 to the step portion 196. A tip end surface of the outer insulating tube portion 141 is formed to be flush with the step portion 196.

In the small-diameter receiving portion 192 in the housing 10, the inner electrode 30, the inner insulating tube portion 151, the outer-electrode tube portion 121, and the outer insulating tube portion 141 are received in a state in which they are arranged by being stacked radially outwards in this order from the center axis side.

As described above, the outer insulating tube portion 141 is arranged between the inner circumferential surface of the small-diameter receiving portion 192 of the housing 10 and the outer circumferential surface of the outer-electrode tube portion 121, and the inner insulating tube portion 151 is arranged between an inner circumferential surface of the outer-electrode tube portion 121 and the outer circumferential surface of the inner electrode 30. Thus, the positions of the outer electrode 20 and the inner electrode 30 in the radial direction are defined by the outer insulating tube portion 141 and the inner insulating tube portion 151.

The inner insulating tube portion 151 has a first insulating tube portion 157 that is arranged between the large-diameter portion 131 of the inner electrode 30 and the outer-electrode tube portion 121 and a second insulating tube portion 158 that is arranged between the small-diameter portion 132 of the inner electrode 30 and the outer-electrode tube portion 121.

The inside of the first insulating tube portion 157 is formed as the tip end side receiving portion 157a that receives the large-diameter portion 131 of the inner electrode 30, and the inside of the second insulating tube portion 158 is formed as the base end side receiving portion 158a that receives the small-diameter portion 132 of the inner electrode 30. The outer diameter of the small-diameter portion 132 of the inner electrode 30 is smaller than the outer diameter of the large-diameter portion 131. In addition, the outer-electrode tube portion 121 has the constant inner diameter over the entire length of the outer-electrode tube portion 121. Therefore, the thickness of the second insulating tube portion 158 is thicker (greater) than the thickness of the first insulating tube portion 157.

Because the inner diameter of the tip end side receiving portion 157a is larger than the inner diameter of the base end side receiving portion 158a, a step portion 159 is formed between an inner circumferential surface of the tip end side receiving portion 157a and an inner circumferential surface of the base end side receiving portion 158a. A step portion formed between an outer circumferential surface of the large-diameter portion 131 and an outer circumferential surface of the small-diameter portion 132 comes to contact with the step portion 159. Thus, the position of the inner electrode 30 in the axial direction is defined by the inner spacer 50.

The outer spacer 40, the outer electrode 20, the inner spacer 50, and the inner electrode 30 are arranged coaxially, and they are aligned such that their center axes coincide with the center axis of the housing 10. As described above, the positions of the outer electrode 20 and the inner electrode 30 in the radial direction and in the axial direction are defined by, the outer spacer 40 and the inner spacer 50. With such a configuration, it is possible to easily perform a fixing operation of fixing the inner electrode 30 and the outer electrode 20 to the housing 10 with screws, etc. In addition, it is possible to keep the distance between the inner electrode 30 and the outer electrode 20 constant and to maintain the detection accuracy of the oil-property detection device 100.

The outer diameter of the outer-electrode flange 122 is set so as to have a dimension smaller than the inner diameter of the large-diameter receiving portion 191, and thereby, the outer-electrode flange 122 is prevented from coming into contact with the large-diameter receiving portion 191.

An outer first seal member 171 that is an annular O-ring for sealing between the housing 10 and the outer spacer 40 is provided between the step portion 195 and the outer insulating flange 142. The outer first seal member 171 is provided in an annular groove provided in the step portion 195. An outer second seal member 172 that is an annular O-ring for sealing between the outer spacer 40 and the outer electrode 20 is provided between the outer insulating flange 142 and the outer-electrode flange 122. The outer second seal member 172 is arranged in an annular groove provided in the outer insulating flange 142.

With such a configuration, there is no need to provide a space for arranging a seal member in the outer-electrode tube portion 121 and the outer insulating tube portion 141. Thus, the thickness of each of the outer-electrode tube portion 121 and the outer insulating tube portion 141 can be made thin, and so, it is possible to reduce the size of the oil-property detection device 100.

An inner first seal member (a first seal member) 173 that is an annular O-ring for sealing between the inner spacer 50 and the outer electrode 20 is provided between the second insulating tube portion 158 and the outer-electrode tube portion 121. The inner first seal member 173 is arranged in an annular groove 158g provided in the second insulating tube portion 158. With such a configuration, it is possible to improve the strength of the inner spacer 50 as compared with a case in which the annular groove for arranging the seal member is provided in the first insulating tube portion 157.

If the annular groove is provided in the first insulating tube portion 157 by increasing the thickness of the first insulating tube portion 157 in order to ensure the strength, it becomes necessary to increase the outer diameter of the inner spacer 50 or to reduce the outer diameter of the large-diameter portion 131. If the outer diameter of the inner spacer 50 is increased, there will be a problem in that the size of the oil-property detection device 100 is increased in the radial direction. In addition, if the outer diameter of the large-diameter portion 131 is reduced, the distance between the outer electrode 20 and the inner electrode 30 forming the detection portion 23 is increased, and thereby, there will be a problem in that the detection accuracy is deteriorated. In contrast, in this embodiment, because the annular groove 158g is provided in the second insulating tube portion 158, it is possible to improve the detection accuracy of the oil-property detection device 100, and at the same time, it is also possible to reduce the size of the oil-property detection device 100.

An inner second seal member (a second seal member) 174 that is an annular O-ring for sealing between the inner electrode 30 and the inner spacer 50 is provided between the large-diameter portion 131 of the inner electrode 30 and the first insulating tube portion 157. The inner second seal member 174 is arranged in an annular groove 131g provided in the large-diameter portion 131. With such a configuration, it is possible to improve the strength of the inner electrode 30 as compared with a case in which the annular groove for arranging the seal member is provided in the small-diameter portion 132.

If the annular groove is provided in the small-diameter portion 132 while ensuring the strength, the outer diameter of the small-diameter portion 132 needs to be increased. In this case, because the distance between the inner electrode 30 and the outer electrode 20 is shortened, there will be a problem in that the stray capacitance is increased. In contrast, in this embodiment, because the annular groove 131g is provided in the large-diameter portion 131, it is possible to reduce the outer diameter of the small-diameter portion 132. As a result, it is possible to improve the detection accuracy by reducing the stray capacitance.

The electrode cover 60 is inserted into and attached to the middle-diameter receiving portion 193 provided in the attachment portion 111 by press-fitting. It should be noted that a fixing method is not limited to the press-fitting, and various fixing methods such as crimping process, welding, and so forth can be employed. The electrode cover 60 is a cylindrical member having a bottom, and has a disc-shaped bottom portion 161 and a side portion 162 that is erected upwards from an outer circumference edge of the bottom portion 161.

As the electrode cover 60 is inserted and attached, the tip end portions of the outer electrode 20 and the inner electrode 30 are covered by the electrode cover 60. Therefore, during an operation of attaching the oil-property detection device 100 to the piping 1, direct contact of an outer circumferential surface of the piping 1, a jig, and so forth to the tip end portions of the outer electrode 20 and the inner electrode 30 (the detection portion 23) can be avoided, and thereby, it is possible to prevent the tip end portions of the electrodes (the detection portion 23) from being damaged. Because the tip end portions of the electrodes (the detection portion 23) can be protected with the electrode cover 60, it is possible to provide the oil-property detection device 100 having a high reliability.

The electrode cover 60 and the outer electrode 20 are formed with a plurality of opening portions for guiding the working oil to the inside.

Figure 4:
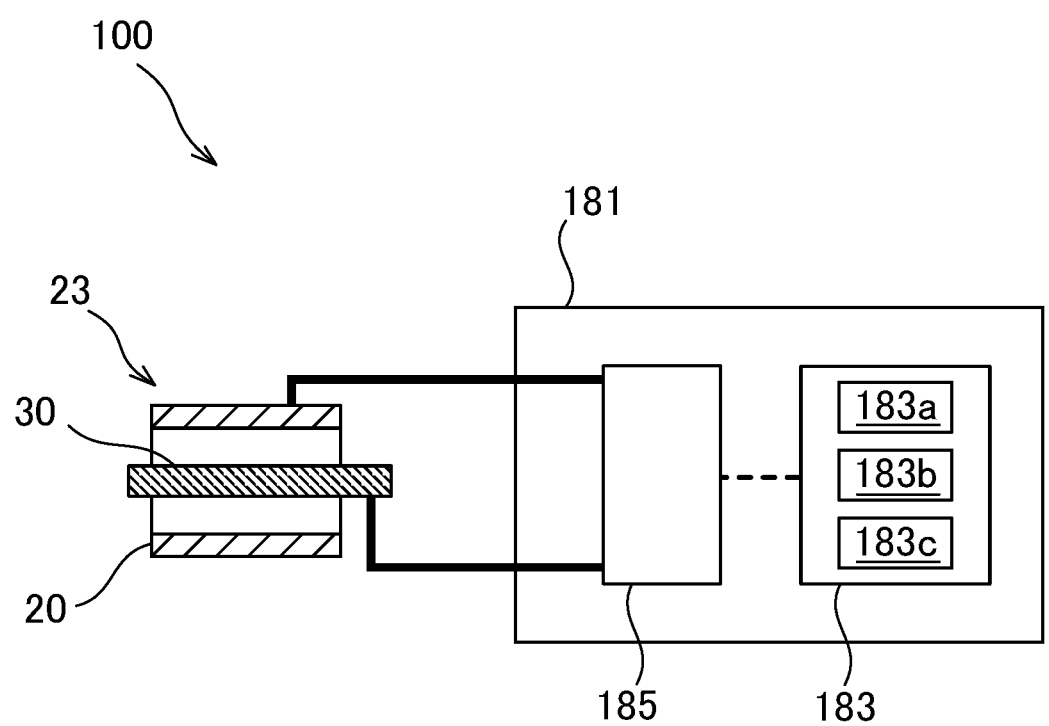
FIG. 4 is a schematic view showing a configuration of the oil-property detection device.

As shown in FIG. 4, the detection circuit 185 connected to the inner electrode 30 and the outer electrode 20 detects the voltage value applied between the inner electrode 30 and the outer electrode 20 and the voltage value correlated to the current value between and the inner electrode 30 and the outer electrode 20. The voltage value detected by the detection circuit 185 is output to a control unit 183 mounted on the circuit board 181 as the electrical property of the working oil.

The control unit 183 is a microcomputer, and has: a computing unit 183a that computes the electrical conductivity and relative dielectric constant that are property values of the working oil on the basis of the voltage value that is the electrical property between the tip end portion of the outer electrode 20 and the tip end portion of the inner electrode 30 forming the detection portion 23; a storage unit 183b that is capable of storing the electrical conductivity and the relative dielectric constant computed by the computing unit 183a and the voltage value detected by the detection portion 23; an auxiliary storage unit 183c such as a ROM, a RAM, and so forth that stores a program, etc. used by the computing unit 183a; and an input-output interface (not shown). The computing unit 183a is a so-called central processing unit (CPU), and the storage unit 183b is a nonvolatile memory such as a rewritable EEPROM, etc. The control unit 183 outputs the computed result from the computing unit 183a to an external control device (not shown) arranged outside the oil-property detection device 100.

The computing unit 183a computes the electrostatic capacitance between the inner electrode 30 and the outer electrode 20 on the basis of the detection result from the detection circuit 185 and computes the relative dielectric constant of the working oil on the basis of the computed electrostatic capacitance. In addition, the computing unit 183a computes the resistance value between the inner electrode 30 and the outer electrode 20 on the basis of the detection result from the detection circuit 185 and computes the electrical conductivity of the working oil on the basis of the computed resistance value. As described above, with the oil-property detection device 100, the properties of the working oil in the gap between the inner electrode 30 and the outer electrode 20 are detected.

Figure 5:
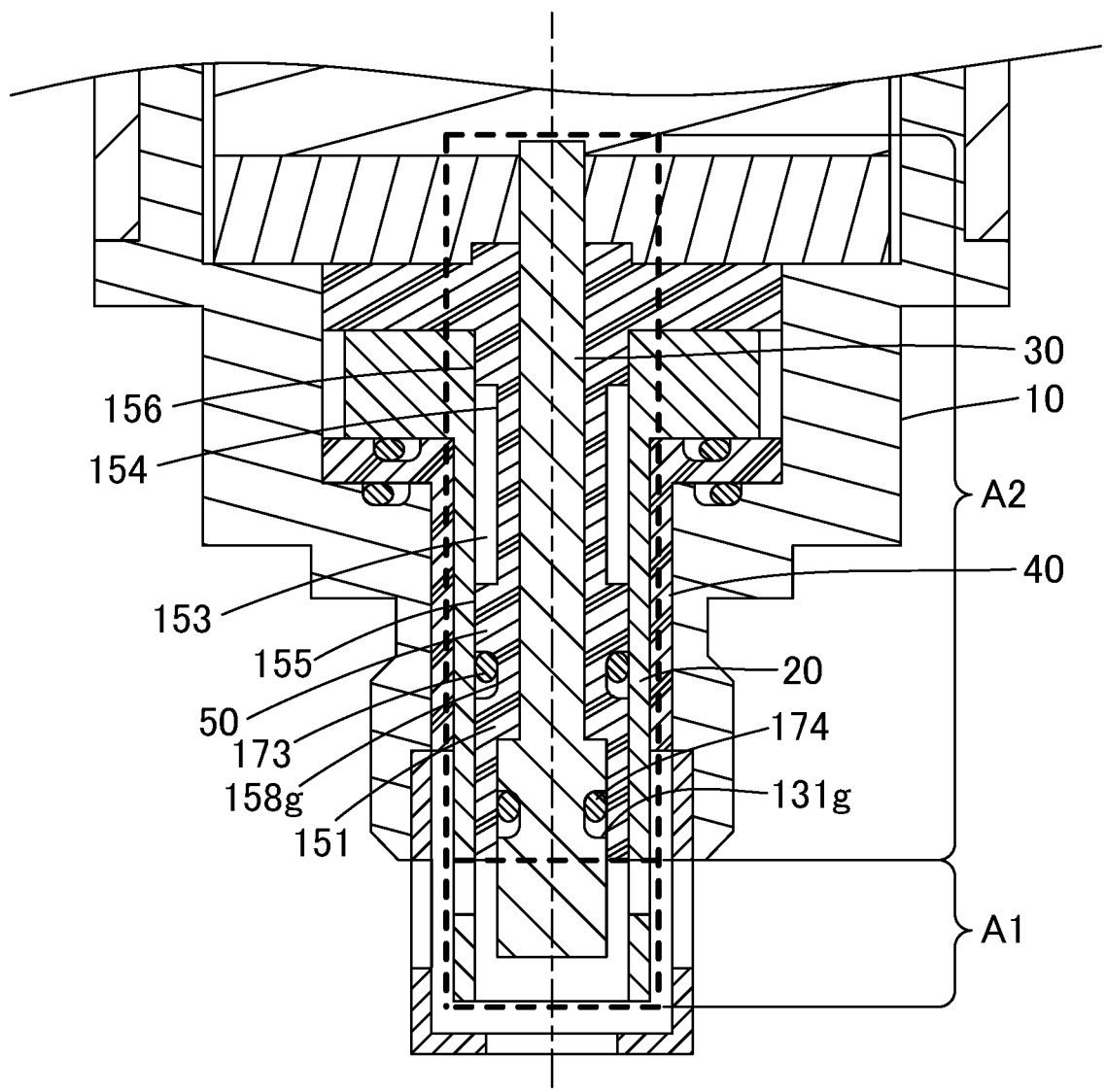
FIG. 5 is a diagram showing a detection region and a non-detection region.

As shown in FIG. 5, in this embodiment, a region on the tip end side from the tip end surface of the inner insulating tube portion 151 in the axial direction, i.e. the region in which the outer circumferential surface of the inner electrode 30 and the inner circumferential surface of the outer electrode 20 are exposed to the working oil is set as a detection region A1. A region on the base end side of the detection region A1 in the axial direction is set as a non-detection region A2.

A total electrostatic capacitance C between the inner electrode 30 and the outer electrode 20 that has been detected by the detection circuit 185 includes the electrostatic capacitance between the inner electrode 30 and the outer electrode 20 in the non-detection region A2 as stray capacitance Cr in addition to electrostatic capacitance Ce between the inner electrode 30 and the outer electrode 20 in the detection region A1.

Therefore, the computing unit 183a computes the electrostatic capacitance Ce between the inner electrode 30 and the outer electrode 20 in the detection region A1 by subtracting the stray capacitance Cr from the total electrostatic capacitance C (Ce=C−Cr).

Here, if the percentage of the stray capacitance Cr in the total electrostatic capacitance C is large, the detection accuracy for the electrostatic capacitance Ce is deteriorated. Thus, in this embodiment, a hollow portion 153 is provided in order to reduce the percentage of the stray capacitance Cr in the total electrostatic capacitance C.

The hollow portion 153 is formed between the inner electrode 30 and the outer electrode 20 in the region corresponding to the non-detection region A2 in which the inner electrode 30 and the outer electrode 20 are not exposed to the working oil. The hollow portion 153 is formed by a recessed portion 154 provided in the inner insulating tube portion 151.

Figure 6:
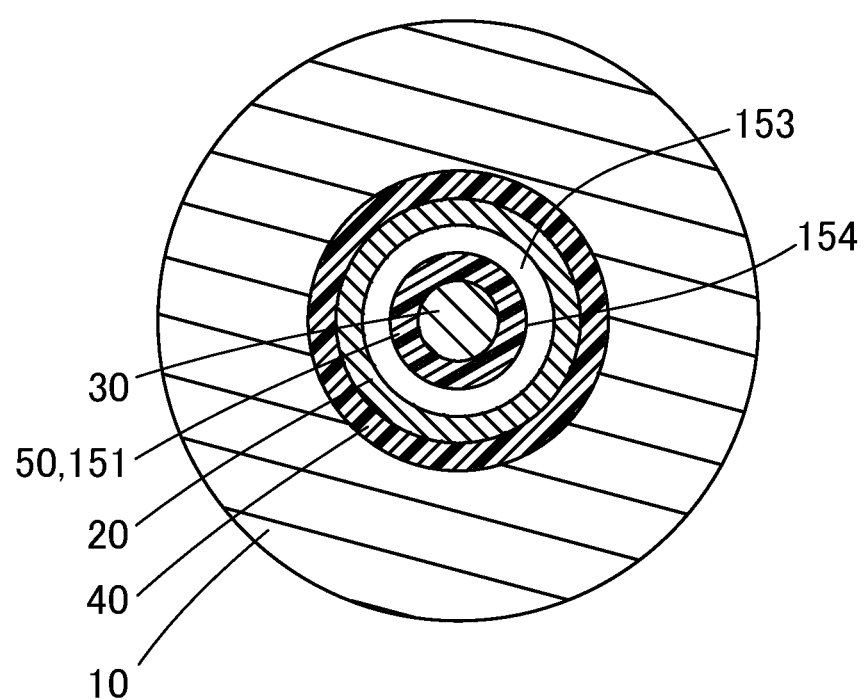
FIG. 6 is a schematic view of a lateral cross-section of the oil-property detection device taken along a line VI-VI in FIG. 3.

As shown in FIGS. 3, 5, and 6, the recessed portion 154 serves as a reduced-thickness portion that opens on the outer circumferential surface side of the inner insulating tube portion 151. The recessed portion 154 is provided along the circumferential direction of the inner insulating tube portion 151 over the entire circumference of the outer circumferential surface of the inner insulating tube portion 151. As described above, the hollow portion 153 having a cylindrical shape is defined by a bottom portion of the recessed portion 154, a pair of side surfaces (a tip end surface and a base end surface) of the recessed portion 154, and the inner circumferential surface of the outer-electrode tube portion 121. The hollow portion 153 is a space in which the insulating member and the electrodes are not provided, in other words, the hollow portion 153 is a space containing air having the small relative dielectric constant (substantially equal to 1).

As a material of the inner spacer 50, a petroleum-based resin material having the relative dielectric constant of 3 to 5 is employed. Therefore, by forming the hollow portion 153 in which the resin material is not present, it is possible to reduce the stray capacitance Cr. As described above, according to this embodiment, because the percentage of the stray capacitance Cr in the total electrostatic capacitance C that is detected between the inner electrode 30 and the outer electrode 20 can be reduced, it is possible to increase the detection accuracy of the oil-property detection device 100 for the electrostatic capacitance Ce.

By forming the recessed portion 154 that opens on the outer circumferential surface side of the inner insulating tube portion 151 having a tubular shape, a better processability is attained as compared with a case in which a recessed portion that opens on the inner circumferential surface side is formed. In addition, because the recessed portion 154 is formed over the entire circumference of the outer circumferential surface of the inner insulating tube portion 151 having the tubular shape, a better processability is attained as compared with a case in which the recessed portions are formed discontinuously along the circumferential direction.

Because the working oil has the relative dielectric constant of 2 to 5, if the working oil enters the recessed portion 154, the stray capacitance is increased correspondingly. In this embodiment, as shown in FIGS. 3 and 5, the recessed portion 154 is provided on the base end side of the inner first seal member 173. Because the inner first seal member 173 can prevent the working oil from entering the recessed portion 154, it is possible to prevent the increase in the stray capacitance Cr due to the entry of the working oil to the recessed portion 154.

The inner spacer 50 has a tip-end-side holding portion 155 that is provided on the tip end side of the recessed portion 154 and a base-end-side holding portion 156 that is provided on the base end side of the recessed portion 154. The tip-end-side holding portion 155 defines the distance between the inner electrode 30 and the outer electrode 20 by being brought into contact with each of the inner electrode 30 and the outer electrode 20. The base-end-side holding portion 156 defines the distance between the inner electrode 30 and the outer electrode 20 by being brought into contact with each of the inner electrode 30 and the outer electrode 20. Each of the holding portions (155 and 156) holds the inner electrode 30 and the outer electrode 20 such that an inter-electrodes distance between the inner electrode 30 and the outer electrode 20 does not become equal to or shorter than a predetermined distance.

With such a configuration, it is possible to prevent the outer electrode 20 from being tilted with respect to the center axis of the housing 10 and from being deviated in the radial direction, and thereby, it is also possible to prevent the distance between the outer electrode 20 and the inner electrode 30 from being reduced. As a result, it is possible to ensure the insulation between the inner electrode 30 and the outer electrode 20 in the hollow portion 153.

According to the above-described first embodiment, following operational advantages are afforded.

The recessed portion 154 is provided in the inner spacer 50, and by the recessed portion 154, the hollow portion 153 is formed between the inner electrode 30 and the outer electrode 20 in the non-detection region A2 that are not exposed to the working oil. With such a configuration, because the stray capacitance Cr can be reduced, it is possible to improve the detection accuracy of the oil-property detection device 100 for the electrostatic capacitance Ce.

Second Embodiment

Figure 7:
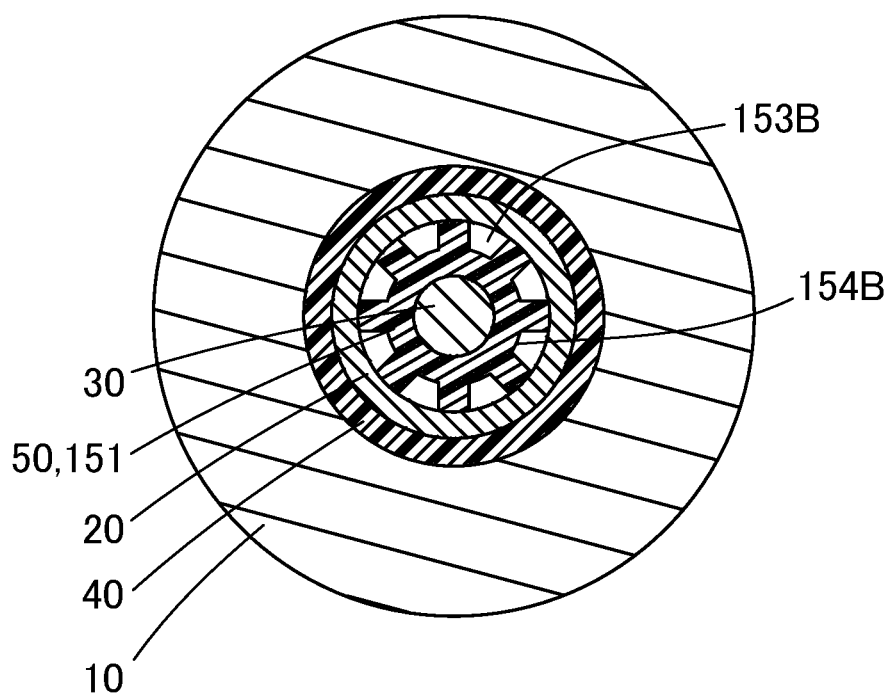
FIG. 7 is a schematic view of a lateral cross-section of the oil-property detection device according to a second embodiment of the present invention.

The oil-property detection device 100 according to a second embodiment of the present invention will be described with reference to FIG. 7. In the following, differences from the above-mentioned first embodiment will be mainly described, and in the figures, components that are the same as or correspond to the components described in the above-mentioned first embodiment are assigned the same reference numerals and description thereof will be omitted.

In the first embodiment, a description has been given of an example in which the recessed portion 154 is provided over the entire circumference of the inner insulating tube portion 151. In contrast, in the second embodiment, a plurality of recessed portions 154B are provided at equal intervals in the circumferential direction of the inner insulating tube portion 151, and a plurality of hollow portions 153B are formed by being defined by the inner circumferential surface of the outer electrode 20 and an inner circumferential surface of the recessed portions 154B.

According to the second embodiment as described above, the operational advantages similar to those of the first embodiment are afforded. It should be noted that the case in which the recessed portion 154 is provided over the entire circumference of the inner insulating tube portion 151 as in the first embodiment is preferred, because of the better processability.

Third Embodiment

Figure 8:
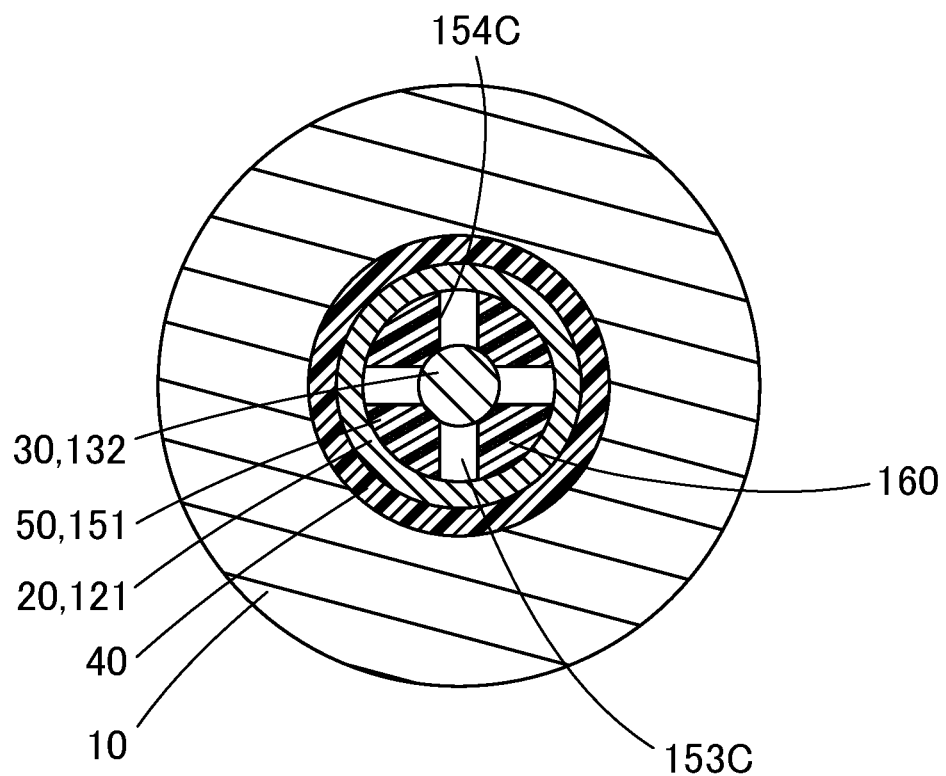
FIG. 8 is a schematic view of a lateral cross-section of the oil-property detection device according to a third embodiment of the present invention.

The oil-property detection device 100 according to a third embodiment of the present invention will be described with reference to FIG. 8. In the following, differences from the above-mentioned first embodiment will be mainly described, and in the figures, components that are the same as or correspond to the components described in the above-mentioned first embodiment are assigned the same reference numerals and description thereof will be omitted.

In the first embodiment, a description has been given of an example in which the recessed portion 154 is provided as the reduced-thickness portion in order to form the hollow portion 153. In contrast, in the third embodiment, as the reduced-thickness portion, through holes 154C that penetrate from the outer circumferential surface to an inner circumferential surface of the inner insulating tube portion 151 in the radial direction are formed. The through holes 154C open at each of the outer circumferential surface side and the inner circumferential surface side of the inner insulating tube portion 151. Therefore, hollow portions 153C are each defined by an inner circumferential surface of the through hole 154C, the inner circumferential surface of the outer-electrode tube portion 121, and the outer circumferential surface of the small-diameter portion 132 of the inner electrode 30.

Between the through holes 154C adjacent to each other, an inter-holes holding portion 160 is each provided so as to come into contact with each of the inner circumferential surface of the outer-electrode tube portion 121 and the outer circumferential surface of the small-diameter portion 132 of the inner electrode 30 and so as to define the distance between the outer electrode 20 and the inner electrode 30. Because the outer electrode 20 and the inner electrode 30 can be supported at both sides of the hollow portions 153C in the radial direction, it is possible to further improve an alignment accuracy for the outer electrode 20 and the inner electrode 30.

According to the third embodiment as described above, the operational advantages similar to those of the first embodiment are afforded. Because the through holes 154C open at each of the outer circumferential surface side and the inner circumferential surface side of the inner insulating tube portion 151, it is possible to perform the processing from the outer side of the inner insulating tube portion 151 with ease.

Fourth Embodiment

Figure 9:
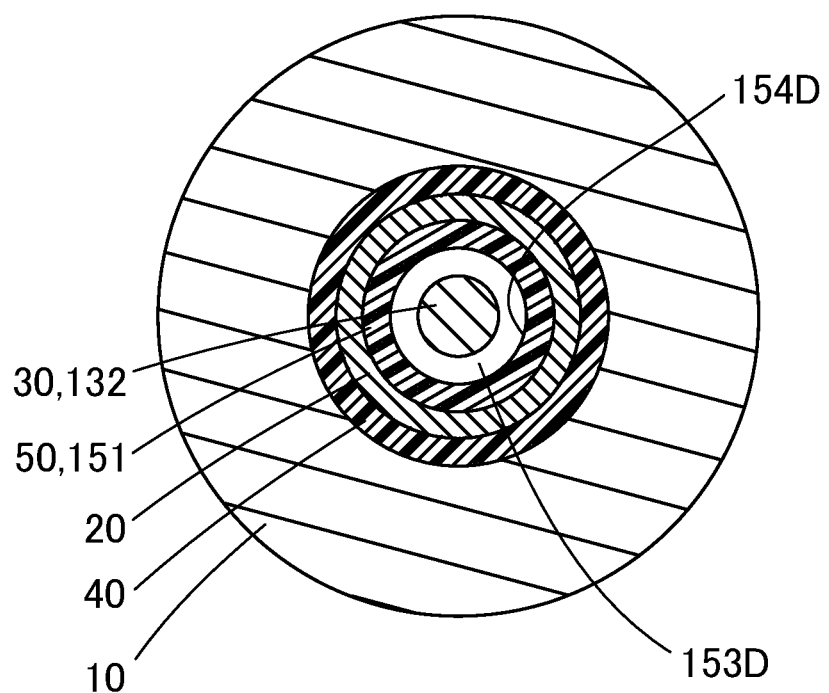
FIG. 9 is a schematic view of a lateral cross-section of the oil-property detection device according to a fourth embodiment of the present invention.

The oil-property detection device 100 according to a fourth embodiment of the present invention will be described with reference to FIG. 9. In the following, differences from the above-mentioned first embodiment will be mainly described, and in the figures, components that are the same as or correspond to the components described in the above-mentioned first embodiment are assigned the same reference numerals and description thereof will be omitted.

In the first embodiment, a description has been given of an example in which the recessed portion 154 is formed in the outer circumferential surface of the inner insulating tube portion 151. In contrast, in the fourth embodiment, a recessed portion 154D is formed in the inner circumferential surface of the inner insulating tube portion 151. The recessed portion 154D extends to the base end surface of the inner spacer 50 in the axial direction. The recessed portion 154D can be processed from the base end surface side of the inner spacer 50.

The recessed portion 154D opens on the inner circumferential surface side of the inner insulating tube portion 151. Therefore, a hollow portion 153D is defined by a bottom portion of the recessed portion 154D, a pair of side surfaces of the recessed portion 154D, and the outer circumferential surface of the small-diameter portion 132 of the inner electrode 30.

According to the fourth embodiment as described above, the operational advantages similar to those of the first embodiment are afforded. It should be noted that the case in which the recessed portion 154 is formed on the outer circumferential side of the inner insulating tube portion 151 as in the first embodiment is preferred, because of the better processability. In addition, because the recessed portion 154D does not open on the outer circumferential surface side of the inner insulating tube portion 151, it is possible to omit the inner first seal member 173.

Following modifications are also within the scope of the present invention, and it is also possible to combine the configurations shown in the modification with the configurations described in the above-described embodiment, to combine the configurations described in the above-described different embodiments, and to combine the configurations described in the following different modifications.

First Modification

The shapes of the outer electrode 20, the inner electrode 30, the outer spacer 40 and the inner spacer 50 are not limited to those in the above-mentioned embodiment, and various shapes can be employed. For example, although a description has been given of an example in which the inner electrode 30 is provided with the large-diameter portion 131 and the small-diameter portion 132 having the circular columnar shape, the inner electrode 30 may have a configuration in which the large-diameter portion 131 and the small-diameter portion 132 having the cylindrical shape are provided.

Second Modification

The present invention may also be applied to an oil-property detection device that is provided with, instead of the tubular outer electrode 20 and the bar-shaped inner electrode 30, a first electrode having a flat plate shape and a second electrode having a flat plate shape that is provided so as to face the first electrode.

Third Modification

In a case in which an axial lengths of the inner electrode 30 and the outer electrode 20 are short, the base-end-side holding portion 156 may be omitted.

Fourth Modification

The configuration of the reduced-thickness portion for forming the hollow portion is not limited to the above-mentioned embodiments. For example, the reduced-thickness portion of the inner spacer 50 serving as the insulating member may be configured by separating the inner insulating tube portion 151 and the inner insulating flange 152. In addition, the hollow portion may also be formed by dividing the inner spacer 50 in the axial direction, and by bringing the recessed portions respectively provided on a pair of the divided spacers as the reduced-thickness portions into contact with each other. In this case, the hollow portion is defined only by inner circumferential surfaces of the pair of recessed portions.

The configurations, operations, and effects of the embodiments of the present invention will be collectively described below.

The oil-property detection device 100 is the fluid-property detection device for detecting the property of the working oil (detection target fluid) including: the first electrode (the inner electrode 30); the second electrode (the outer electrode 20) provided so as to face the first electrode (the inner electrode 30); and the inner spacer (the insulating member) 50 provided between the first electrode (the inner electrode 30) and the second electrode (the outer electrode 20), the inner spacer 50 being configured to insulate between the first electrode (the inner electrode 30) and the second electrode (the outer electrode 20), wherein the inner spacer 50 is provided with the reduced-thickness portion (the recessed portion 154, 154B, and 154D, and the through holes 154C) for forming the hollow portion (153, 153B, 153C, and 153D) between the first electrode (the inner electrode 30) and the second electrode (the outer electrode 20) in the non-detection region A2 in which the first electrode and the second electrode are not exposed to the working oil.

With this configuration, because the hollow portion (153, 153B, 153C, and 153D) is provided between the first electrode (the inner electrode 30) and the second electrode (the outer electrode 20) in the non-detection region A2, the stray capacitance Cr is reduced compared with a case in which the hollow portion (153, 153B, 153C, and 153D) is not provided. With such a configuration, it is possible to improve the detection accuracy of the oil-property detection device 100 for the electrostatic capacitance Ce.

In the oil-property detection device 100, the first electrode is the bar-shaped inner electrode 30, the second electrode is the tubular outer electrode 20, the inner electrode 30 and the outer electrode 20 are provided coaxially, the inner spacer 50 has the tubular inner insulating tube portion (the insulating tube portion) 151 arranged between the inner electrode 30 and the outer electrode 20, and the reduced-thickness portion (the recessed portion 154, 154B, and 154D, and the inner insulating tube portion 151 is provided with the through holes 154C).

With this configuration, because the hollow portion (153, 153B, 153C, and 153D) is provided between the inner electrode 30 and the outer electrode 20 in the non-detection region A2, the stray capacitance Cr is reduced compared with a case in which the hollow portion (153, 153B, 153C, and 153D) is not provided. With such a configuration, it is possible to improve the detection accuracy of the oil-property detection device 100 for the electrostatic capacitance Ce.

The oil-property detection device 100 further includes the inner first seal member (the first seal member) 173 provided between the inner insulating tube portion 151 and the outer electrode 20, the inner first seal member 173 being configured to seal between the inner spacer 50 and the outer electrode 20, wherein the reduced-thickness portion (the recessed portion 154 and 154B, the through holes 154C) is provided on the base end side of the inner first seal member 173, the reduced-thickness portion opening on the outer circumferential surface side of the inner insulating tube portion 151.

With this configuration, because the reduced-thickness portion (the recessed portion 154 and 154B, the through holes 154C) opens on the outer circumferential surface side of the inner insulating tube portion 151, a better processability is attained as compared with a case in which the reduced-thickness portion does not open on the outer circumferential surface side, for example, as compared with a case in which the reduced-thickness portion opens only on the inner circumferential surface side. Because the entry of the working oil to the hollow portion (153, 153B, and 153C) can be prevented by the inner first seal member 173, it is possible to prevent the increase in the stray capacitance Cr due to the entry of the working oil to the hollow portion (153, 153B, and 153C).

In the oil-property detection device 100, the reduced-thickness portion (the recessed portion 154) is provided over the entire circumference of the outer circumferential surface of the inner insulating tube portion 151.

With this configuration, because the reduced-thickness portion (the recessed portion 154) is provided over the entire circumference of the outer circumferential surface of the inner insulating tube portion 151, a better processability is attained as compared with a case in which the reduced-thickness portions are formed discontinuously along the circumferential direction of the inner insulating tube portion 151.

In the oil-property detection device 100, the reduced-thickness portion (the through holes 154C) penetrates from the outer circumferential surface to the inner circumferential surface of the inner insulating tube portion 151.

With this configuration, because the reduced-thickness portion (the through holes 154C) opens at each of the outer circumferential surface side and the inner circumferential surface side of the inner insulating tube portion 151, a better processability is attained as compared with a case in which the reduced-thickness portion does not open on the outer circumferential surface side, for example, as compared with a case in which the reduced-thickness portion opens only on the inner circumferential surface side.

In the oil-property detection device 100, the inner spacer 50 has: the tip-end-side holding portion 155 provided on the tip end side of the reduced-thickness portion (the recessed portion 154, 154B, and 154D, and the through holes 154C) so as to come into contact with each of the inner electrode 30 and the outer electrode 20, the tip-end-side holding portion 155 being configured to define the distance between the inner electrode 30 and the outer electrode 20; and the base-end-side holding portion 156 provided on the base end side of the reduced-thickness portion (the recessed portion 154, 154B, and 154D, and the through holes 154C) so as to come into contact with each of the inner electrode 30 and the outer electrode 20, the base-end-side holding portion 156 being configured to define the distance between the inner electrode 30 and the outer electrode 20.

With this configuration, because the distance between the inner electrode 30 and the outer electrode 20 can be defined by the tip-end-side holding portion 155 and the base-end-side holding portion 156 on both end sides of the reduced-thickness portion (the recessed portion 154, 154B, and 154D, and the through holes 154C) in the axial direction, it is possible to ensure the insulation between the inner electrode 30 and the outer electrode 20 in the hollow portion (153, 153B, 153C, and 153D).

The oil-property detection device 100 further includes the inner second seal member (the second seal member) 174 provided between the inner electrode 30 and the inner spacer 50, the inner second seal member 174 being configured to seal between the inner electrode 30 and the inner spacer 50, wherein the inner electrode 30 has: the circular columnar large-diameter portion 131 provided on the tip end; and the circular columnar small-diameter portion 132 having the smaller outer diameter than the large-diameter portion 131, the small-diameter portion 132 extending from the large-diameter portion 131 to the base end side, the inner insulating tube portion 151 has: the first insulating tube portion 157 arranged between the large-diameter portion 131 and the outer electrode 20; and the second insulating tube portion 158 arranged between the small-diameter portion 132 and the outer electrode 20, the second insulating tube portion 158 having a greater thickness than the first insulating tube portion 157, the inner first seal member 173 is arranged in the annular groove 158g provided in the second insulating tube portion 158, and the inner second seal member 174 is arranged in the annular groove 131g provided in the large-diameter portion 131.

With this configuration, because the annular groove 158g, in which the inner first seal member 173 is arranged, is provided in the second insulating tube portion 158, it is possible to improve the strength of the inner spacer 50 as compared with a case in which an annular groove, in which the inner first seal member 173 is arranged, is provided in the first insulating tube portion 157. In addition, because the annular groove 131g, in which the inner second seal member 174 is arranged, is provided in the large-diameter portion 131, it is possible to improve the strength of the inner electrode 30 as compared with a case in which an annular groove, in which the inner second seal member 174 is arranged, is provided in the small-diameter portion 132.

Embodiments of this invention were described above, but the above embodiments are merely examples of applications of this invention, and the technical scope of this invention is not limited to the specific constitutions of the above embodiments.

This application claims priority based on Japanese Patent Application No. 2017-174362 filed with the Japan Patent Office on Sep. 11, 2017, the entire contents of which are incorporated into this specification.

The invention claimed is:

1. A fluid-property detection device for detecting a property of a detection target fluid comprising:
  a first electrode;
  a second electrode facing the first electrode with a gap therebetween; and
  an insulating member provided between the first electrode and the second electrode to insulate the first electrode from the second electrode, wherein
  the insulating member has a reduced-thickness portion for forming a hollow portion between the first electrode and the second electrode in a non-detection region in which the first electrode and the second electrode are not exposed to the detection target fluid,
  the property of the detection target fluid in the gap between the first electrode and the second electrode is detected in a detection region in which the first electrode and the second electrode are exposed to the detection target fluid, and
  the hollow portion is provided for reducing a percentage of a stray capacitance Cr with respect to a total electrostatic capacitance C between the first electrode and the second electrode, the stray capacitance Cr being an electrostatic capacitance between the first electrode and the second electrode at the non-detection region.

2. A fluid-property detection device, comprising;
  a first electrode;
  a second electrode facing the first electrode; and
  an insulating member provided between the first electrode and the second electrode to insulate the first electrode from the second electrode, wherein
  the insulating member has a reduced-thickness portion for forming a hollow portion between the first electrode and the second electrode in a region in which the first electrode and the second electrode are not exposed to the detection target fluid,
  the first electrode is a bar-shaped inner electrode,
  the second electrode is a tubular outer electrode,
  the inner electrode and the outer electrode are provided coaxially,
  the insulating member has a tubular insulating tube portion arranged between the inner electrode and the outer electrode, and
  the insulating tube portion has the reduced-thickness portion.

3. The fluid-property detection device according to claim 2, further comprising
  a first seal member provided between the insulating tube portion and the outer electrode, the first seal member being configured to seal between the insulating member and the outer electrode, wherein
  the reduced-thickness portion is provided on a base end side of the first seal member, the reduced-thickness portion opening on an outer circumferential surface side of the insulating tube portion.

4. The fluid-property detection device according to claim 3, wherein
  the reduced-thickness portion is provided over entire circumference of the outer circumferential surface of the insulating tube portion.

5. The fluid-property detection device according to claim 3, wherein
  the reduced-thickness portion penetrates from the outer circumferential surface to an inner circumferential surface of the insulating tube portion.

6. The fluid-property detection device according to claim 3, wherein
  the insulating member has:
    a tip-end-side holding portion provided on a tip end side of the reduced-thickness portion so as to come into contact with each of the inner electrode and the outer electrode, the tip-end-side holding portion being configured to define a distance between the inner electrode and the outer electrode; and
    a base-end-side holding portion provided on a base end side of the reduced-thickness portion so as to come into contact with each of the inner electrode and the outer electrode, the base-end-side holding portion being configured to define the distance between the inner electrode and the outer electrode.

7. The fluid-property detection device according to claim 3, further comprising
  a second seal member provided between the inner electrode and the insulating member, the second seal member being configured to seal between the inner electrode and the insulating member, wherein
  the inner electrode has:
    a circular columnar large-diameter portion provided on a tip end; and
    a circular columnar small-diameter portion having a smaller outer diameter than the large-diameter portion, the small-diameter portion extending from the large-diameter portion to the base end side,
  the insulating tube portion has:
    a first insulating tube portion arranged between the large-diameter portion and the outer electrode; and
    a second insulating tube portion arranged between the small-diameter portion and the outer electrode, the second insulating tube portion having a greater thickness than the first insulating tube portion,
  the first seal member is arranged in an annular groove provided in the second insulating tube portion, and
  the second seal member is arranged in an annular groove provided in the large-diameter portion.

* * * * *